US012675182B2

(12) United States Patent
Chung

(10) Patent No.: US 12,675,182 B2
(45) Date of Patent: Jul. 7, 2026

(54) TOUCH SENSING DISPLAY DEVICE

(71) Applicant: LG Display Co., Ltd., Seoul (KR)

(72) Inventor: June Gun Chung, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 50 days.

(21) Appl. No.: 18/790,435

(22) Filed: Jul. 31, 2024

(65) Prior Publication Data

US 2025/0271953 A1     Aug. 28, 2025

(30) Foreign Application Priority Data

Feb. 23, 2024     (KR) ........................ 10-2024-0026569

(51) Int. Cl.
  G06F 3/041     (2006.01)
  G06F 3/044     (2006.01)
(52) U.S. Cl.
  CPC .......... G06F 3/0412 (2013.01); G06F 3/0443 (2019.05)
(58) Field of Classification Search
  None
  See application file for complete search history.

(56) References Cited

U.S. PATENT DOCUMENTS 6,789,030 B1 *   9/2004  Coyle ................... G01D 9/005
                                                        702/182
2025/0208733 A1 *   6/2025  Kim ...................... G06F 3/0418

FOREIGN PATENT DOCUMENTS

CN         106951116 A  *  7/2017  ............. H04N 5/765
CN         208425661 U  *  1/2019
CN         215121263 U  *  12/2021
KR      20170049668 A  *  5/2017  ........... G06F 3/0412

* cited by examiner

*Primary Examiner* — Duane N Taylor, Jr.
(74) *Attorney, Agent, or Firm* — Morgan, Lewis & Bockius LLP

(57)     ABSTRACT

A touch sensing display apparatus may include touch blocks, touch electrodes in each touch block, a readout integrated circuit (ROIC) for sensing the touch electrodes to obtain touch raw data, and a micro control circuit connected to the ROIC through a serial peripheral interface (SPI). A memory of the ROIC may have a 16-bit row unit storage system. Each of a TX memory and an RX memory of the micro control circuit may have a 32-bit row unit storage system. In a touch period for touch driving, J pieces of SPI data having a 12-bit transfer system corresponding to address and command data for reading the touch raw data may be transferred from the micro control circuit to the ROIC, and K pieces of SPI data having a 12-bit transfer system corresponding to the touch raw data may be transferred from the ROIC to the micro control circuit.

10 Claims, 17 Drawing Sheets

| SPI TRANSFER | 1st 12bit | 2nd 12bit | 3rd 12bit | 4th 12bit | 5th 12bit | 6th 12bit | 7th 12bit | 8th 12bit | 9th 12bit | 10th 12bit | 11th 12bit | ... | 59th 12bit | 60th 12bit |
|---|---|---|---|---|---|---|---|---|---|---|---|---|---|---|
| R | R | R | | | | | | | | | | | | |
| | | W | W | W | W | W | W | W | W | W | W | | W | |
| | Address | Command | | | | | Touch Raw Data | | | | | | | |

ROIC

| | 1 | 2 | 3 | 4 | 5 | 6 | 7 | 8 | 9 | 10 | 11 | 12 | ... | 58 |
|---|---|---|---|---|---|---|---|---|---|---|---|---|---|---|
| | Address 16b | Command 16b | 12b | 12b | 12b | 12b | 12b | 12b | 12b | 12b | 12b | 12b | 12b | 12b | dummy DELETION

NUMBER OF SPI TRANSFER

MCU

| 1 | 2 | 3 | 4 | 5 | 6 | 7 | 8 | 9 | 10 | 11 | 12 | ... | 58 | 59 |
|---|---|---|---|---|---|---|---|---|---|---|---|---|---|---|
| 12b | 12b | 12b | 12b | 12b | 12b | 12b | 12b | 12b | 12b | 12b | 12b | 12b | 12b | 12b |

TRANSFER ADDRESS AND COMMAND THROUGH THREE SPIS (12B)

TRANSFER 57 PIECES OF TOUCH RAW DATA THROUGH 57 SPIS (12B)

FIG. 14

| | R0 | R1 |
|---|---|---|
| CMUX1 (SETTING1) | 28 | 26 |
| CMUX2 (SETTING2) | 28 | 26 |
| CMUX3 (SETTING3) | 28 | 26 |
| ... | | |
| CMUX16 (SETTING16) | 26 | 28 |
| CMUX17 (SETTING17) | 26 | 28 |
| CMUX18 (SETTING18) | 26 | 28 |

FIG. 16

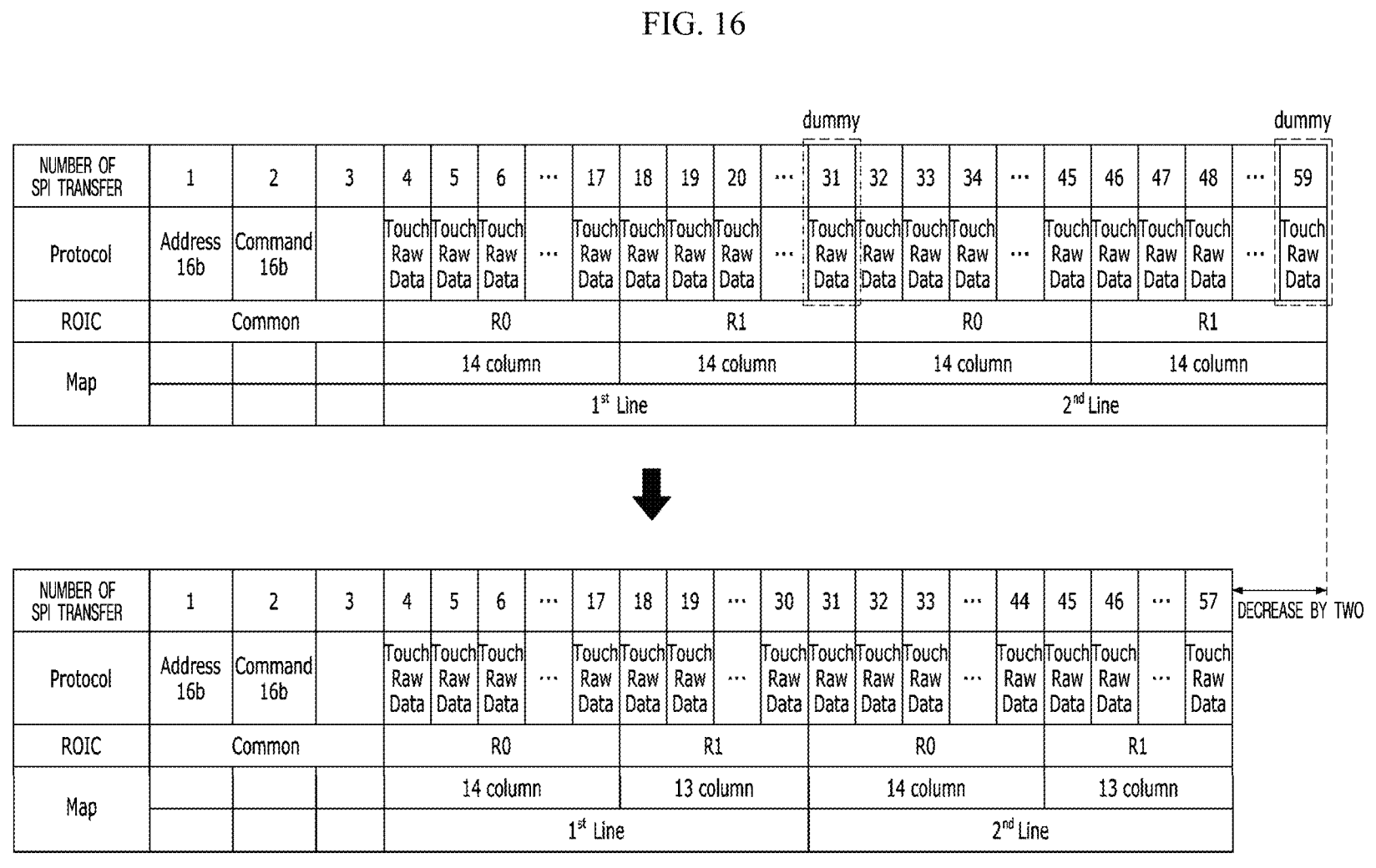

DECREASE BY TWO

First table (top)

dummy

| NUMBER OF SPI TRANSFER | 1 | 2 | 3 | 4 | 5 | 6 | ... | 17 | 18 | 19 | 20 | ... | 31 | 32 | 33 | 34 | ... | 45 | 46 | 47 | 48 | ... | 59 |
|---|---|---|---|---|---|---|---|---|---|---|---|---|---|---|---|---|---|---|---|---|---|---|---|
| Protocol | Address 16b | Command 16b | | Touch Raw Data | Touch Raw Data | Touch Raw Data | ... | Touch Raw Data | Touch Raw Data | Touch Raw Data | Touch Raw Data | ... | Touch Raw Data | Touch Raw Data | Touch Raw Data | Touch Raw Data | ... | Touch Raw Data | Touch Raw Data | Touch Raw Data | Touch Raw Data | ... | Touch Raw Data |
| ROIC | Common | | | R0 | | | | R1 | | | | | R0 | | | | | R1 | | | | | |
| Map | | | | 14 column | | | | 14 column | | | | | 14 column | | | | | 14 column | | | | | |
| | | | | | 1st Line | | | | | | | | | | | | | | 2nd Line | | | | |

Second table (bottom)

| NUMBER OF SPI TRANSFER | 1 | 2 | 3 | 4 | 5 | 6 | ... | 17 | 18 | 19 | ... | 30 | 31 | 32 | 33 | ... | 44 | 45 | 46 | ... | 57 |
|---|---|---|---|---|---|---|---|---|---|---|---|---|---|---|---|---|---|---|---|---|---|
| Protocol | Address 16b | Command 16b | | Touch Raw Data | Touch Raw Data | Touch Raw Data | ... | Touch Raw Data | Touch Raw Data | Touch Raw Data | ... | Touch Raw Data | Touch Raw Data | Touch Raw Data | Touch Raw Data | ... | Touch Raw Data | Touch Raw Data | Touch Raw Data | ... | Touch Raw Data |
| ROIC | Common | | | R0 | | | | R1 | | | | R0 | | | | | R1 | | | | |
| Map | | | | 14 column | | | | 13 column | | | | 14 column | | | | | 13 column | | | | |
| | | | | | 1st Line | | | | | | | | | | | 2nd Line | | | | |

FIG. 17

CMUX1 ~ 9

| NUMBER OF SPI TRANSFER | 1 | 2 | 3 | 4 | 5 | 6 | ... | 17 | 18 | 19 | ... | 30 | 31 | 32 | 33 | ... | 44 | 45 | 46 | ... | 57 |
|---|---|---|---|---|---|---|---|---|---|---|---|---|---|---|---|---|---|---|---|---|---|
| Protocol | Address 16b | Command 16b | | Touch Raw Data | Touch Raw Data | Touch Raw Data | ... | Touch Raw Data | Touch Raw Data | Touch Raw Data | ... | Touch Raw Data | Touch Raw Data | Touch Raw Data | Touch Raw Data | ... | Touch Raw Data | Touch Raw Data | Touch Raw Data | ... | Touch Raw Data |
| ROIC | Common | | | R0 | | | | R1 | | | | R0 | | | | | R1 | | | | |
| Map | | | | 14 column | | | | 13 column | | | | 14 column | | | | | 13 column | | | | |
| | | | | | 1st Line | | | | | | | | | 2nd Line | | | | | | | |

FIG. 18

CMUX10 ~ 18

| NUMBER OF SPI TRANSFER | 1 | 2 | 3 | 4 | 5 | ... | 16 | 17 | 18 | 19 | ... | 30 | 31 | 32 | ... | 43 | 44 | 45 | 46 | ... | 57 |
|---|---|---|---|---|---|---|---|---|---|---|---|---|---|---|---|---|---|---|---|---|---|
| Protocol | Address 16b | Command 16b | | Touch Raw Data | Touch Raw Data | ... | | Touch Raw Data | Touch Raw Data | Touch Raw Data | ... | Touch Raw Data | Touch Raw Data | Touch Raw Data | ... | | Touch Raw Data | Touch Raw Data | Touch Raw Data | ... | Touch Raw Data |
| ROIC | Common | Common | | R0 | R0 | | | R1 | R1 | R1 | | R0 | R0 | R0 | | | R1 | R1 | R1 | | |
| Map | | | | 13 column | 13 column | | | 14 column | 14 column | | | 13 column | 13 column | 13 column | | | 14 column | 14 column | 14 column | | |
| | | | | | | 1st Line | | | | | | | | 2nd Line | | | | | | | |

TOUCH SENSING DISPLAY DEVICE

CROSS-REFERENCE TO RELATED APPLICATIONS

This application claims the benefit of and priority to the Korean Patent Application No. 10-2024-0026569 filed on Feb. 23, 2024, the entirety of which is incorporated herein by reference for all purposes as if fully set forth herein.

BACKGROUND

1. Technical Field

The present disclosure relates to a touch sensing display apparatus.

2. Description of the Related Art

Touch sensing display apparatuses may recognize a touch input of a user applied to a display panel and may perform various application functions based thereon.

Touch sensing display apparatuses may include a plurality of touch electrodes, which are disposed in a display panel for touch recognition, and a touch circuit which drives the touch electrodes. The touch circuit may supply a touch driving signal to the touch electrodes and may detect capacitance magnitudes of the touch electrodes based on the touch driving signal to calculate touch coordinates corresponding to a touch input.

In a case where one frame is temporally divided into a touch period and a display period, a vertical blank period where a write operation (i.e., a charging operation) of image data is not performed may be defined as a touch period. Recently, as a frame rate and a resolution of a display panel increase, a length of the vertical blank period (i.e., a touch period) is reduced, and thus, a touch time of less than 1 msec is needed. To accomplish the touch time, a multi integral function, an analog-to-digital converter (ADC) processing speed, and a transfer time of touch raw data should each operate within 1 msec.

The description of the related art should not be assumed to be prior art merely because it is mentioned in or associated with this section. The description of the related art includes information that describes one or more aspects of the subject technology, and the description in this section does not limit the invention.

SUMMARY

One or more aspects of the present disclosure are directed to an apparatus that substantially obviates one or more problems due to limitations and disadvantages of the related art. In one or more aspects, the present disclosure may provide a touch sensing display apparatus which may decrease a touch transfer time to satisfy a desired spec of a short touch time.

To achieve these objects and other advantages and aspects of the present disclosure, as embodied and broadly described herein, in one or more aspects, a touch sensing display apparatus includes a display panel where a plurality of touch blocks are provided, and a plurality of touch electrodes are provided in one touch block, a readout integrated circuit (IC) configured to sense the plurality of touch electrodes through touch lines to obtain touch raw data, and a micro control circuit connected to the readout IC through a serial peripheral interface (SPI). A memory of the readout IC has a 16-bit row unit storage system, and each of a TX memory and an RX memory of the micro control circuit has a 32-bit row unit storage system. In a touch period for touch driving, J (where J is a natural number) pieces of SPI data having a 12-bit transfer system corresponding to address and command data for reading the touch raw data are for being transferred from the micro control circuit to the readout IC, and K (where K is a natural number which is greater than J) pieces of SPI data having a 12-bit transfer system corresponding to the touch raw data are for being transferred from the readout IC to the micro control circuit.

Additional features, advantages, and aspects of the present disclosure are set forth in part in the description that follows and in part will become apparent from the present disclosure or may be learned by practice of the inventive concepts provided herein. Other features, advantages, and aspects of the present disclosure may be realized and attained by the descriptions provided in the present disclosure, or derivable therefrom, and the claims hereof as well as the drawings. It is intended that all such features, advantages, and aspects be included within this description, be within the scope of the present disclosure, and be protected by the following claims. Nothing in this section should be taken as a limitation on those claims. Further aspects and advantages are discussed below in conjunction with embodiments of the disclosure.

It is to be understood that both the foregoing description and the following description of the present disclosure are examples, and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate example embodiment(s) of the disclosure and together with the description serve to explain the principle of the disclosure. In the drawings:

FIG. 3 is a diagram illustrating some elements of a touch circuit according to one or more present example embodiments;

FIG. 7 is a diagram illustrating a connection configuration between touch electrodes and one channel multiplexer included in a channel multiplexer of a first group;

FIG. 8 is a diagram illustrating a connection configuration between touch electrodes and one channel multiplexer included in a channel multiplexer of a second group;

FIGS. 9 to 11 are diagrams illustrating an operation of a touch circuit according to a first example embodiment for decreasing a touch transfer time;

FIGS. 12 and 13 are diagrams illustrating an operation of a touch circuit according to a second example embodiment for decreasing a touch transfer time; and FIGS. 14 to 18 are diagrams illustrating an operation of a touch circuit according to a third example embodiment for decreasing a touch transfer time.

Figure 1:
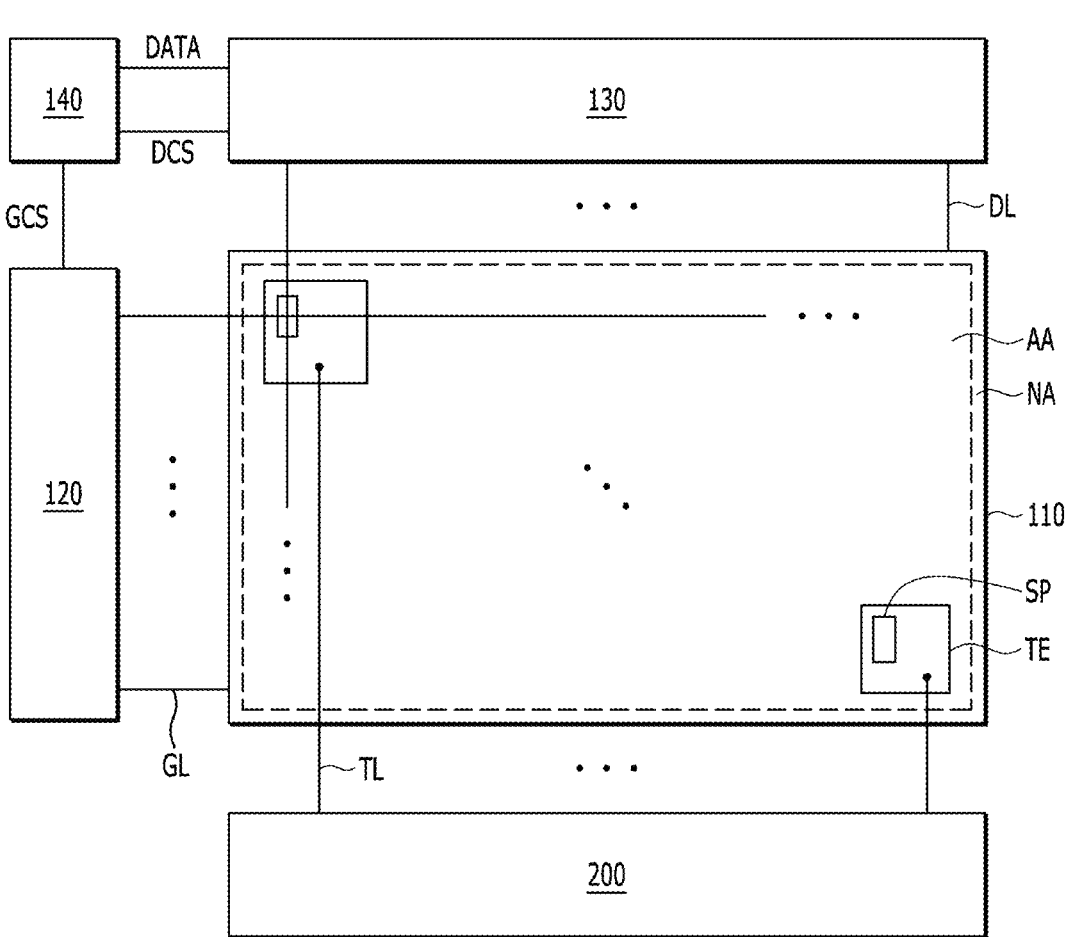
FIG. 1 is a diagram schematically illustrating a touch sensing display apparatus according to one or more present example embodiments.

Throughout the drawings and the detailed description, unless otherwise described, the same drawing reference numerals should be understood to refer to the same elements, features, and structures. The sizes, lengths, and thicknesses of layers, regions and elements, and depiction thereof may be exaggerated for clarity, illustration, and/or convenience.

DETAILED DESCRIPTION

Hereinafter, the present disclosure will be described more fully with reference to the accompanying drawings, in which example embodiments of the disclosure are shown. The disclosure may, however, be embodied in many different forms and should not be construed as being limited to the embodiments set forth herein; rather, these embodiments are provided so that this disclosure will be thorough and complete, and will fully convey the concept of the disclosure to those skilled in the art.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Furthermore, the present disclosure is only defined by scopes of claims.

The shapes, sizes, ratios, angles, numbers and the like disclosed in the drawings for description of various embodiments of the present disclosure to describe embodiments of the present disclosure are merely examples and the present disclosure is not limited thereto. Like reference numerals refer to like elements throughout. Throughout this specification, the same elements are denoted by the same reference numerals. As used herein, the terms "comprise", "having," "including" and the like suggest that other parts can be added unless the term "only" is used. As used herein, the singular forms "a", "an", and "the" are intended to include the plural forms as well, unless context clearly indicates otherwise.

Elements in various embodiments of the present disclosure are to be interpreted as including margins of error even without explicit statements.

In describing a position relationship, for example, when a position relation between two parts is described as "on", "over", "under", and "next", one or more other parts may be disposed between the two parts unless "just" or "direct" is used.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

In the following description, when the detailed description of the relevant known function or configuration is determined to unnecessarily obscure the important point of the present disclosure, the detailed description will be omitted. Hereinafter, example embodiments of the present disclosure will be described in detail with reference to the accompanying drawings.

FIG. 1 is a diagram schematically illustrating a touch sensing display apparatus 100 according to one or more present example embodiments.

Referring to FIG. 1, the touch sensing display apparatus 100 according to one or more present example embodiments may provide a display function of reproducing an input image in a screen thereof and a touch sensing function of sensing a touch input of a user.

The touch sensing display apparatus 100 may include a display panel 110 where a plurality of data lines DL and a plurality of gate lines GL are provided, a display driving circuit for driving the display panel 110, and a timing controller 140.

In terms of functions, the display driving circuit may be divided into a gate driving circuit 120 for driving the gate lines GL and a data driving circuit 130 for driving the data lines DL. The display driving circuit may be implemented as one or more integrated circuits (ICs).

The display panel 110 may include an active region AA where a plurality of subpixels SP are provided and a non-active region NA which is disposed outside the active region AA. Each of a plurality of touch electrodes TE may be disposed in a region corresponding to a plurality of subpixels SP.

The plurality of data lines DL and the plurality of gate lines GL may be disposed in the display panel 110, and subpixels SP may be provided in areas defined by intersections between the data lines DL and the gate lines GL. A plurality of touch lines TL electrically connected to the plurality of touch electrodes TE may be disposed in the display panel 110.

First, elements for display driving in the touch sensing display apparatus 100 will be described below.

The gate driving circuit 120 may be controlled by the timing controller 140 and may sequentially output a scan signal to the plurality of gate lines GL disposed in the display panel 110 to control a driving timing of each of the plurality of subpixels SP.

The gate driving circuit 120 may include one or more gate driver integrated circuits (GDICs), and the GDICs may be disposed at only one side of the display panel 110 or both sides of the display panel 110, based on a driving type.

Each of the GDICs may be connected to a bonding pad of the display panel 110 in a tape automated bonding (TAB) type or a chip on glass (COG) type. Alternatively, each GDIC may be implemented as a gate in panel (GIP) type and may be directly disposed in the display panel 110. Alternatively, each GDIC may be integrated and disposed in the display panel 110. Alternatively, each GDIC may be implemented as a chip on film (COF) type mounted on a film connected to the display panel 110.

The data driving circuit 130 may receive image data DATA from the timing controller 140 and may convert the image data DATA into analog data voltages. The data driving circuit 130 may output the data voltages to the data lines DL in synchronization with a timing at which the scan signal is applied through the gate lines GL and may thus allow the data voltages to be written in the subpixels SP.

The data driving circuit 130 may include one or more source driver integrated circuits (SDICs). Each of the SDICs may include a shift register, a latch circuit, a digital-to-analog converter (DAC), and an output buffer.

Each SDIC may be connected to a bonding pad of the display panel 110 in the TAB type or the COG type. Alternatively, each SDIC may be directly disposed in the display panel 110. Alternatively, each SDIC may be integrated and disposed in the display panel 110. Alternatively, each SDIC may be implemented as the COF type. In this case, each SDIC may be mounted on a film connected to the display panel 110 and may be electrically connected to the display panel 110 through lines of the film.

The timing controller 140 may supply various control signals to the gate driving circuit 120 and the data driving circuit 130 and may control operating timings of the gate driving circuit 120 and the data driving circuit 130.

The timing controller 140 may be mounted on a printed circuit board (PCB) or a flexible PCB and may be electrically connected to the gate driving circuit 120 and the data driving circuit 130 through the PCB or the FPCB.

The timing controller 140 may allow the gate driving circuit 120 to output the scan signal, based on a timing set in each frame, and may allow the data driving circuit 130 to convert image data DATA into data voltages in synchronization with the scan signal.

The timing controller 140 may receive, from the outside (for example, a host system), various timing signals including a vertical synchronization signal VSYNC, a horizontal synchronization signal HSYNC, an input data enable signal DE, and a clock signal CLK along with the image data.

The timing controller 140 may generate a gate control signal GCS and a data control signal DCS by using the various timing signals received from the outside, may output the gate control signal GCS to the gate driving circuit 120, and may output the data control signal DCS to the data driving circuit 130.

The gate control signal GCS may include a gate start pulse GSP, a gate shift clock GSC, and a gate output enable signal GOE. The gate start pulse GSP may control an operation start timing of each of one or more GDICs configuring the gate driving circuit 120. The gate shift clock GSC may be a clock signal which is input to one or more GDICs in common and may control a shift timing of the scan signal. The gate output enable signal GOE may control an output timing of each of one or more GDICs.

The data control signal DCS may include a source start pulse SSP, a source sampling clock SSC, and a source output enable signal SOE. The source start pulse SSP may control a data sampling start timing of each of one or more SDICs configuring the data driving circuit 130. The source sampling clock SSC may be a clock signal which controls a sampling timing of data in each SDIC. The source output enable signal SOE may control an output timing of the data driving circuit 130.

The touch sensing display apparatus 100 may further include a power management IC which supplies various voltages or currents to the display panel 110, the gate driving circuit 120, and the data driving circuit 130, or controls various voltages or currents which are to be supplied.

Hereinafter, elements for touch sensing driving in the touch sensing display apparatus 100 will be described below.

The touch sensing display apparatus 100 may include a touch screen panel where a plurality of touch electrodes TE are disposed for touch sensing and a touch circuit 200 which drives and senses the touch screen panel.

The touch screen panel may be an external type where the touch screen panel is manufactured independently from the display panel 110 and is bonded to the display panel 110, or may be an internal type where the touch screen panel is manufactured together in a manufacturing process of the display panel 110 and is provided in the display panel 110. In the touch sensing display apparatus 100 according to one or more present example embodiments, the touch screen panel may be an independent panel including the touch sensing function, or may denote the display panel 110 which has all of the touch sensing function and the display function. Hereinafter, the internal type where the touch screen panel is in the display panel 110 will be described for example.

The touch circuit 200 may drive and sense the plurality of touch electrodes TE disposed in the display panel 110. The touch circuit 200 may supply a touch driving signal to the touch electrodes TE, may receive and accumulate a touch sensing signal from the touch electrodes TE, and may detect touch coordinates and whether there is a touch, based on a touch sensing accumulation signal. The touch circuit 200 may be implemented as one element or two or more elements (for example, ICs) and may be implemented independently from the display driving circuit. Also, all or a portion of the touch circuit 200 may be integrated and implemented in the display driving circuit or an internal circuit thereof. For example, a portion of the touch circuit 200 may be implemented as an IC along with the data driving circuit 130.

The touch electrode TE may be an electrode which is disposed by dividing a common electrode for display driving. In this case, the touch electrode TE may perform a function of an electrode for touch sensing and a function of an electrode for display sensing.

For example, the touch electrode TE may be driven as the touch electrode TE and the common electrode in a temporally divided period. Alternatively, the touch electrode TE may simultaneously perform a function of the touch electrode TE and a function of the common electrode.

The touch circuit 200 may supply the touch driving signal to the touch electrode TE in a display driving period or a temporally divided period of the display driving period to perform touch sensing.

Figure 2:
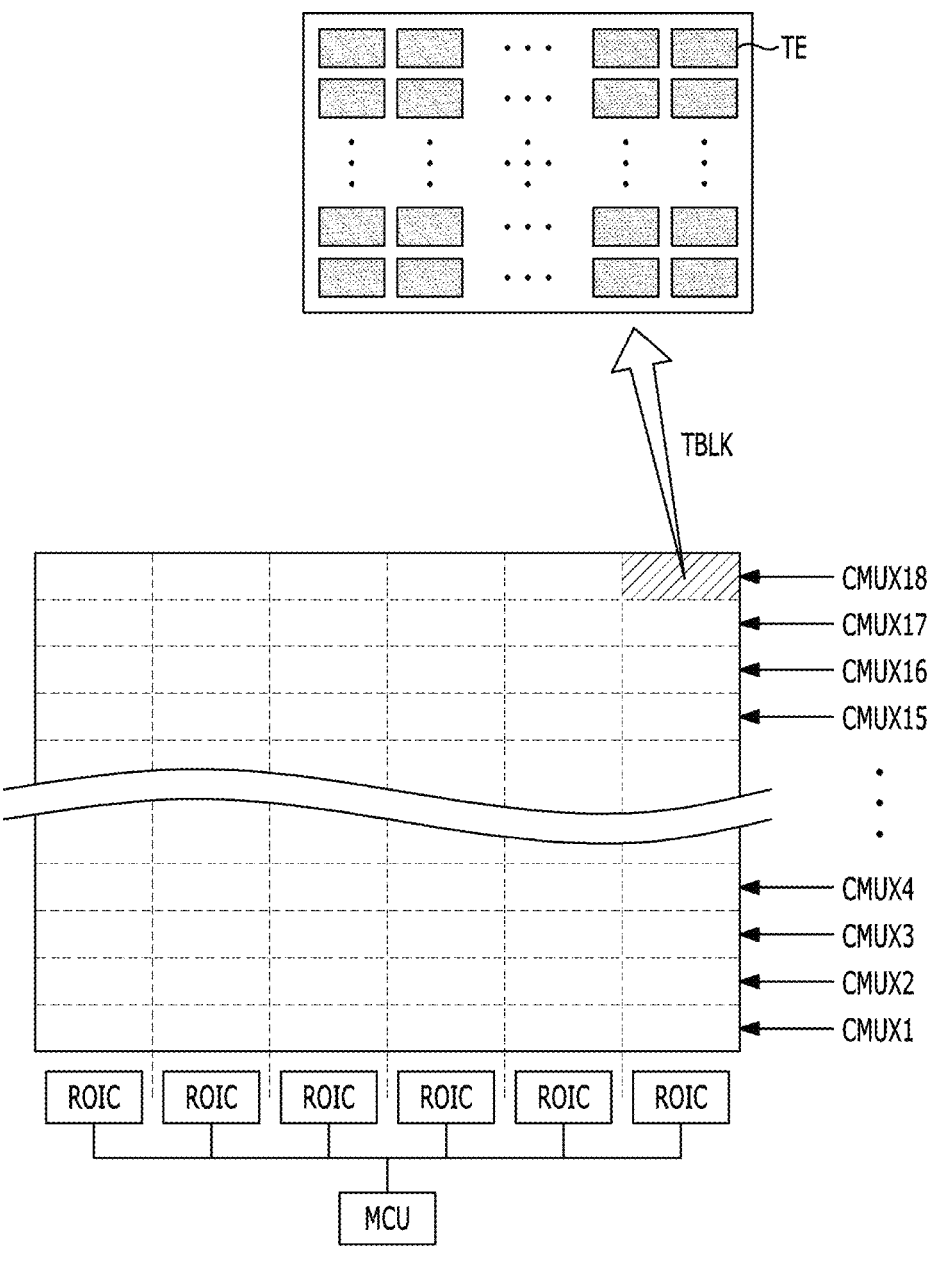
FIG. 2 is a diagram illustrating a matching configuration between a touch circuit and a touch block according to one or more present example embodiments.

FIG. 2 is a diagram illustrating a matching configuration between a touch circuit and a touch block according to one or more present example embodiments.

Referring to FIG. 2, the touch circuit 200 according to one or more present example embodiments may include a micro control unit (MCU) and a readout IC (ROIC).

The display panel 110 may be divided into a plurality of columns in an X-axis direction to correspond to a plurality of ROICs and may be divided into a plurality of rows in a Y-axis direction to correspond to a plurality of channel multiplexers CMUX1 to CMUX18. Each channel multiplexer may select a touch block TBLK of a corresponding row. Each ROIC may drive and sense a touch block TBLK selected by a channel multiplexer from among touch blocks TBLK of a corresponding row.

Each touch block TBLK may include a plurality of touch electrodes TE. Each of the plurality of touch electrodes TE may be connected to a corresponding ROIC through a touch line (TL of FIG. 1). The number of touch lines TL may correspond to the number of touch electrodes TE, but is not limited thereto. The touch lines TL may be connected to sensing circuits (SSU of FIG. 3) of the ROIC through a selected channel multiplexer.

The sensing circuits (SSU of FIG. 3) of the ROIC may be connected to one of touch blocks TBLK of a corresponding row through one of the plurality of channel multiplexers CMUX1 to CMUX18. For example, the sensing circuits (SSU of FIG. 3) of the ROIC may be selectively connected to a touch block TBLK of a first row through the channel multiplexer CMUX1 and may be selectively connected to a touch block TBLK of a second row through the channel multiplexer CMUX2. Likewise, the sensing circuits (SSU of FIG. 3) of the ROIC may be selectively connected to a touch block TBLK of an eighteenth row through the channel multiplexer CMUX18.

Figure 3:
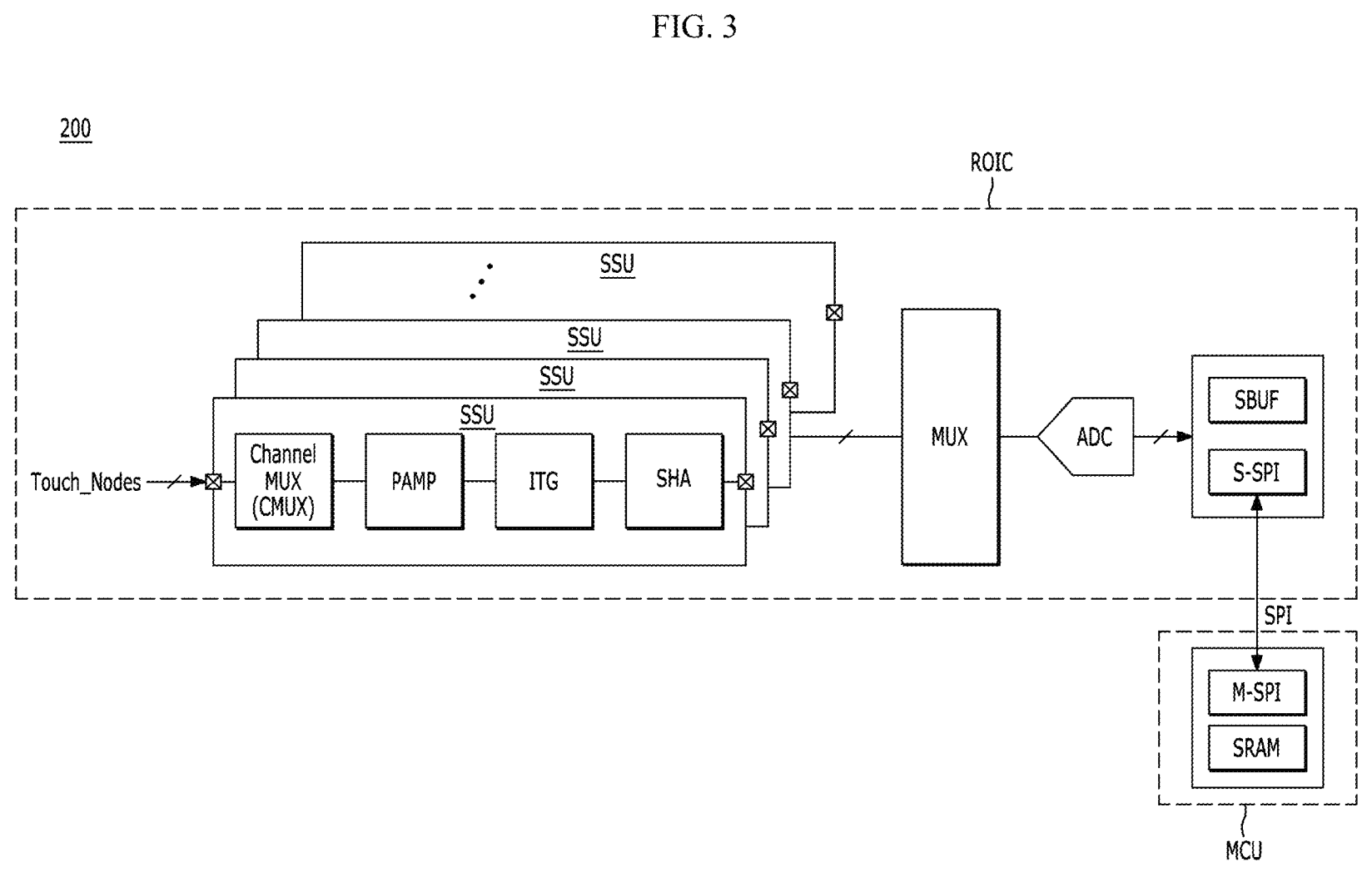

FIG. 3 is a diagram illustrating some elements of a touch circuit 200 according to one or more present example embodiments.

Referring to FIG. 3, an ROIC may include sensing circuits SSU for sensing touch electrodes TE (which may be referred to as Touch_Nodes or TN) included in one touch block TBLK while one channel multiplexer CMUX is operating. The number of sensing circuits SSU may correspond to the number of touch lines TL or may correspond to the number of touch electrodes TN, but is not limited thereto.

Each of sensing circuits SSU may include a preamplifier circuit PAMP, an integral circuit ITG, and a sample and hold circuit SHA. The preamplifier circuit PAMP and the integral circuit ITG may accumulate a touch sensing signal of a touch electrode TE received through a touch line TL, based on a touch driving signal. The sample and hold circuit SHA may store and output a final accumulated touch sensing accumulation signal.

A plurality of touch sensing accumulation signals output from the sensing circuits SSU may be sequentially selected one-by-one through an output multiplexer MUX and may then be input to an ADC. The ADC may convert the touch sensing accumulation signal, input through the output multiplexer MUX, into a digital value and may store converted touch raw data in a buffer memory SBUF.

An MCU and the ROIC may be connected to each other through a serial peripheral interface (SPI) and may transfer and receive relevant control signals and touch raw data therebetween. In an SPI communication scheme, the MCU may be a master device, and the ROIC may be a slave device. The MCU may include a master SPI port M-SPI, and the ROIC may include a slave SPI port S-SPI. The master SPI port M-SPI and the slave SPI port S-SPI may be connected to each other through a plurality of transfer lines.

The MCU may calculate touch coordinates corresponding to a touch input position, based on the touch raw data. The MCU may store a touch coordinate value in an internal memory SRAM.

Figure 4:
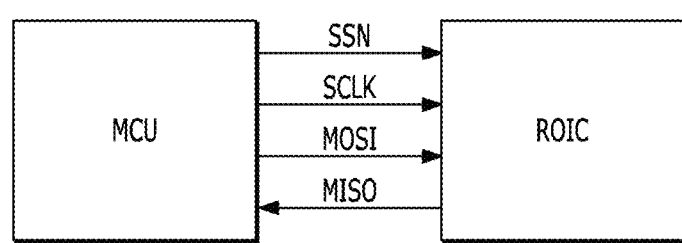
FIG. 4 is a diagram illustrating an example where a micro control unit (MCU) and a readout integrated circuit (ROIC) are connected to a serial peripheral interface (SPI) of a single read type.

FIG. 4 is a diagram illustrating an example where an MCU and an ROIC are connected to a SPI of a single read type.

Referring to FIG. 4, in a touch circuit 200 according to one or more present example embodiments, an MCU and an ROIC may be connected to each other through an SPI of a single read type. In a case where a connection interface is designed as an SPI of a single read type instead of a dual read type, the manufacturing cost of the MCU may decrease.

The SPI of the single read type may include an SCLK pin connected to a first transfer lane, a master output slave input (MOSI) pin connected to a second transfer lane, a master input slave output (MISO) pin connected to a third transfer lane, and a slave select (SSN) pin connected to a fourth transfer lane.

The first to fourth transfer lanes may be driven through single direction interfacing.

That is, the MCU may exclusively have a driving authority of the SCLK pin connected to the first transfer lane, a driving authority of the MOSI pin connected to a second transfer lane, and a driving authority of the SSN pin connected to the fourth transfer lane. The ROIC may exclusively have a driving authority of the MISO pin connected to the third transfer lane.

Figure 5:
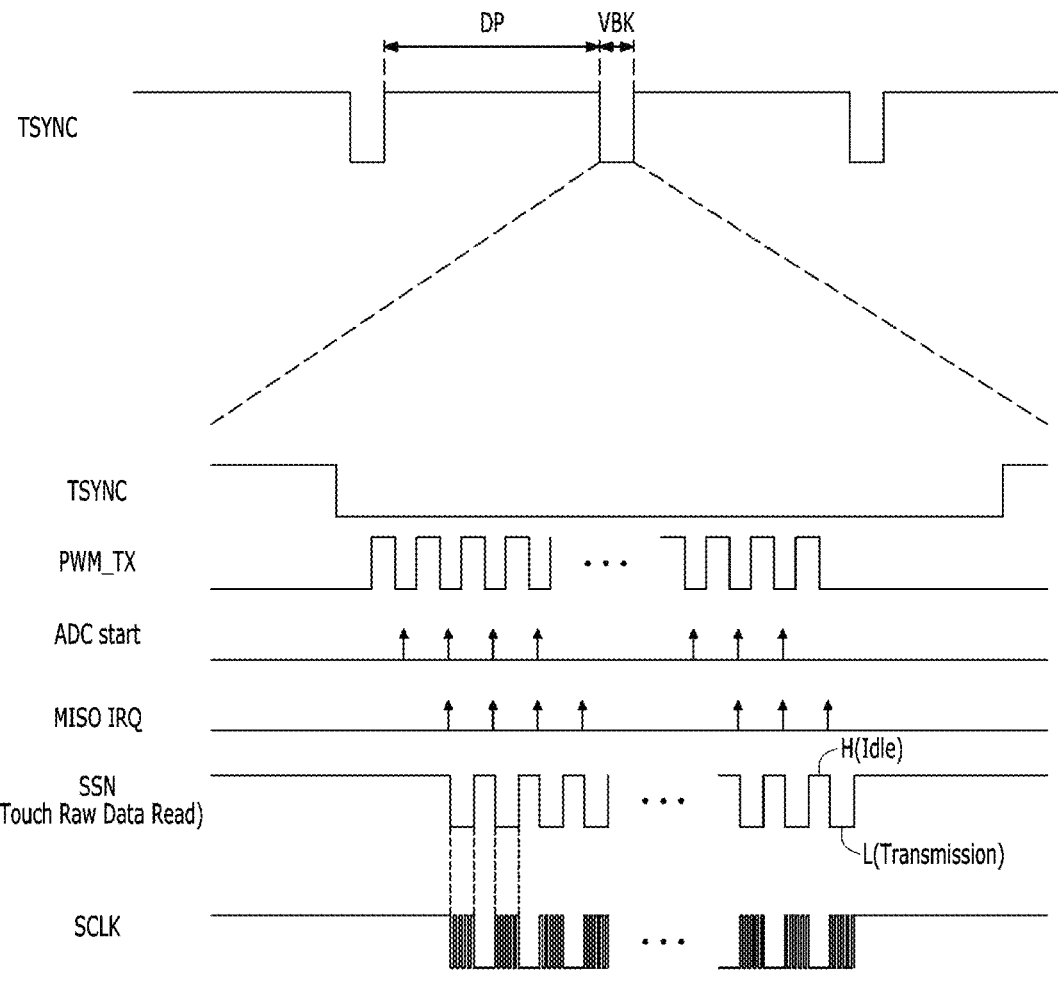
FIG. 5 is a diagram illustrating an example where a touch period according to one or more present example embodiments is set to a vertical blank period where a write operation of image data is not performed.

FIG. 5 is a diagram illustrating an example where a touch period according to one or more present example embodiments is set to a vertical blank period VBK where a write operation of image data is not performed.

One frame may be temporally divided into a vertical active period DP and a vertical blank period VBK with respect to a touch synchronization signal TSYNC. The vertical active period DP may correspond to a high period H of the touch synchronization signal TSYNC, and the vertical blank period VBK may correspond to a low period L of the touch synchronization signal TSYNC. A data voltage for displaying an image on pixels of a display panel may be written (charged) in the vertical active period DP, and a write operation of a data voltage may stop in the vertical blank period VBK.

The vertical active period DP may be a display period, and the vertical blank period VBK may be a touch period.

Sensing circuits of an ROIC may supply a touch driving signal PWM_TX to a touch block and may perform a touch sensing operation, based on the touch driving signal PWM_TX. The sensing circuits of the ROIC may convert a touch sensing accumulation signal into digital touch raw data by using an ADC. For example, 56 touch electrodes may be allocated per one channel multiplexer, and 56 pieces of touch raw data may be obtained per one channel multiplexer. In this case, each ROIC may calculate 1008(18*56) pieces of touch raw data through 18 channel multiplexers which are sequentially enabled, and thus, one touch frame may be completed.

Whenever one touch frame is completed, the ROIC may generate an interrupt request signal MISO IRQ to transfer to the MCU. The MCU may read touch raw data from the ROIC in a row period of an SSN, based on an SCLK. The touch raw data may be transferred from the ROIC to the MCU through an MISO transfer lane in the row period of the SSN, and the transfer of the touch raw data may stop in a high period of the SSN.

Figure 6:
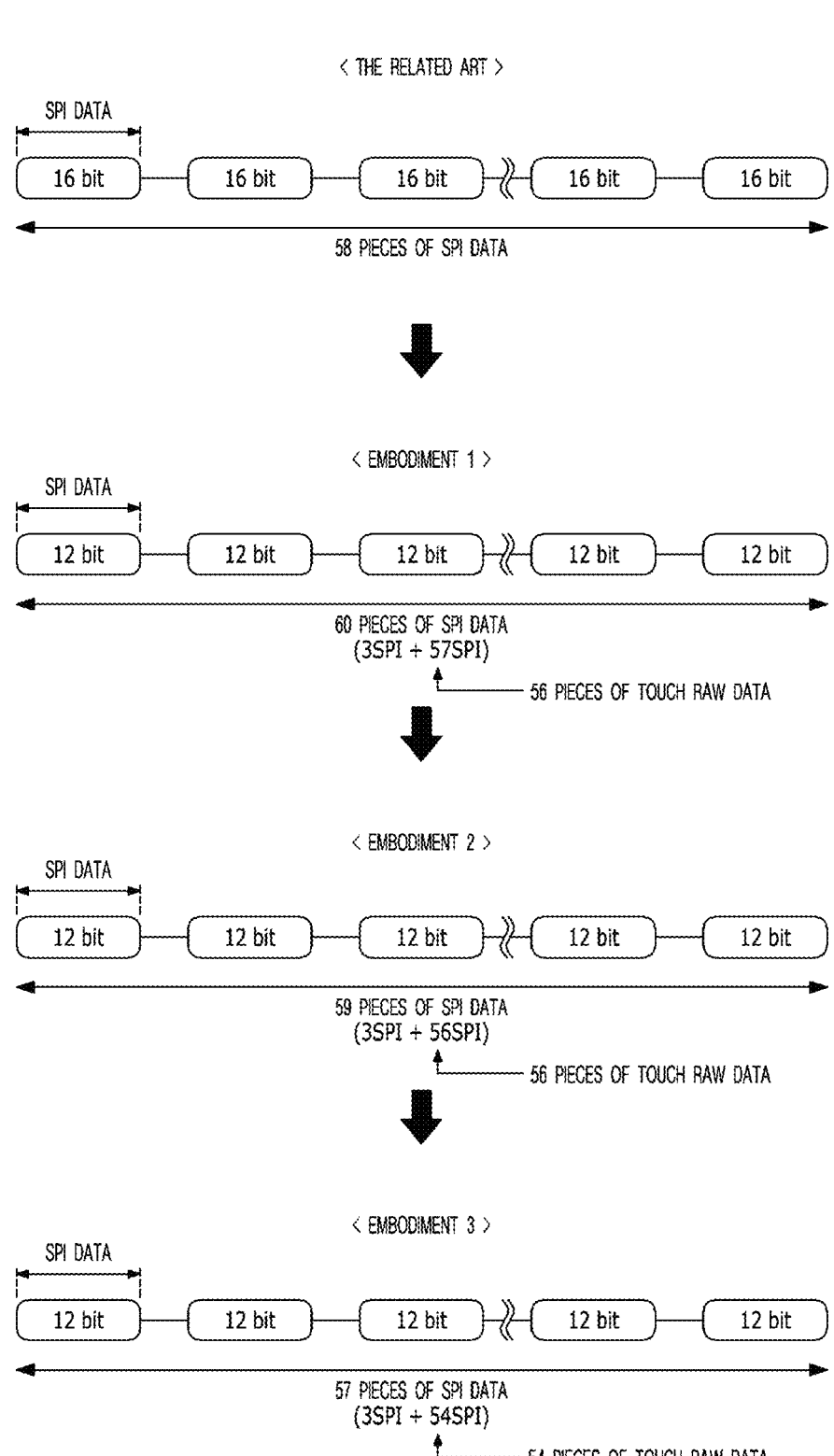
FIG. 6 is a diagram schematically illustrating a comparison of the related art and concepts of the present example embodiments for decreasing a touch transfer time.

FIG. 6 is a diagram schematically illustrating a comparison of the related art and concepts of the present example embodiments for decreasing a touch transfer time.

The related art of FIG. 6 implements SPI data by 16 bit units, based on the single read type. In the related art, 58 pieces of SPI data each having a 16-bit transfer system may each correspond to one channel multiplexer. Here, 58 pieces of SPI data may include 56 pieces of SPI data having the 16-bit transfer system corresponding to touch raw data and two pieces of SPI data having the 16-bit transfer system corresponding to address and command data. The total number of SPI data corresponding to 18 channel multiplexers may be 1044(58*18 CMUX). When an SPI transfer speed is 15 MHz, a total transfer time of SPI data corresponding to 18 channel multiplexers may be 1.2 msec to 1.3 msec and may be greater than 1 msec which is a desired spec of a short touch time.

In the present example embodiments, in the single read type, a total transfer time of SPI data corresponding to 18 channel multiplexers may be within a touch time of 1 msec. To this end, the present example embodiments implement SPI data by 12 bit units by using a conventional MCU memory and a memory of the ROIC, based on the single read type.

To this end, in a first example embodiment of FIG. 6, 60 pieces of SPI data each having a 12-bit transfer system may each correspond to a channel multiplexer. Here, 60 pieces of SPI data may include 57 pieces of SPI data having the 12-bit transfer system corresponding to touch raw data and three pieces of SPI data having the 12-bit transfer system corresponding to address and command data. The total number of SPI data corresponding to 18 channel multiplexers may be 1080(60*18 CMUX), but because each SPI data has the 12-bit transfer system, the total amount of transfer may decrease compared to the related art. When an SPI transfer speed is 15 MHz, a total transfer time of SPI data corresponding to 18 channel multiplexers may satisfy 1 msec which is a desired spec of a short touch time.

The first example embodiment will be described in detail with reference to FIGS. 9 to 11.

Moreover, in a second example embodiment of FIG. 6, 59 pieces of SPI data each having the 12-bit transfer system may each correspond to a channel multiplexer. Here, 59 pieces of SPI data may include 56 pieces of SPI data having the 12-bit transfer system corresponding to touch raw data and three pieces of SPI data having the 12-bit transfer system corresponding to address and command data. The total number of SPI data corresponding to 18 channel multiplexers may be 1062(59*18 CMUX), but because each SPI data has the 12-bit transfer system, the total amount of transfer may decrease compared to the related art. In an example embodiment 2, the number of SPI data may decrease by one compared to an example embodiment 1. When an SPI transfer speed is 15 MHz, a total transfer time of SPI data corresponding to 18 channel multiplexers may satisfy 1 msec which is a desired spec of a short touch time.

The second example embodiment will be described in detail with reference to FIGS. 12 and 13.

Moreover, in a third example embodiment of FIG. 6, 57 pieces of SPI data each having the 12-bit transfer system may each correspond to a channel multiplexer. Here, 57 pieces of SPI data may include 54 pieces of SPI data having the 12-bit transfer system corresponding to touch raw data and three pieces of SPI data having the 12-bit transfer system corresponding to address and command data. The total number of SPI data corresponding to 18 channel multiplexers may be 1026(57*18 CMUX), but because each SPI data has the 12-bit transfer system, the total amount of transfer may considerably decrease compared to the related art. In an example embodiment 3, the number of SPI data may decrease by two compared to an example embodiment 2. When an SPI transfer speed is 15 MHz, a total transfer time of SPI data corresponding to 18 channel multiplexers may satisfy 1 msec which is a desired spec of a short touch time.

The third example embodiment will be described in detail with reference to FIGS. 14 to 18.

Figure 7:
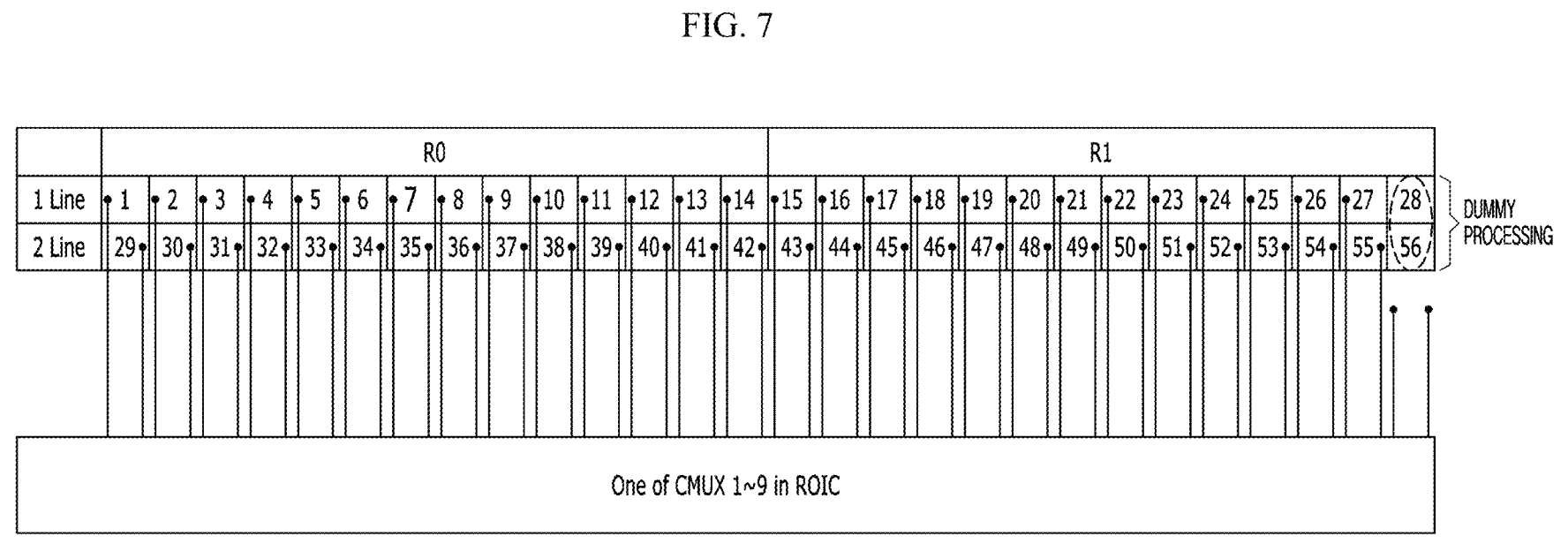
Figure 8:
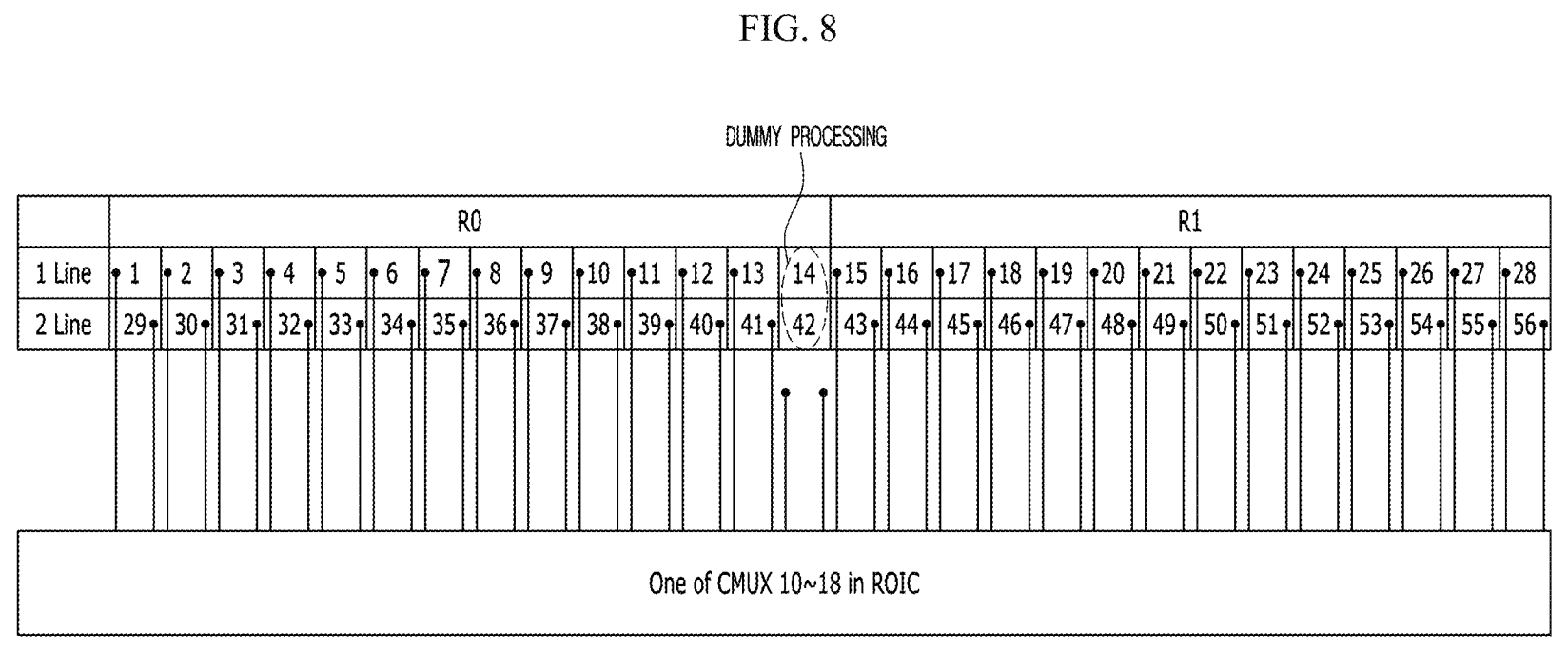

FIG. 7 is a diagram illustrating a connection configuration between touch electrodes and one channel multiplexer included in a channel multiplexer of a first group. FIG. 8 is a diagram illustrating a connection configuration between touch electrodes and one channel multiplexer included in a channel multiplexer of a second group.

Referring to FIGS. 7 and 8, 18 channel multiplexers CMUX1 to CMUX18 may include channel multiplexers CMUX1 to CMUX9 of a first group and channel multiplexers CMUX10 to CMUX18 of a second group.

The channel multiplexers CMUX1 to CMUX9 of the first group and the channel multiplexers CMUX10 to CMUX18 of the second group may have a difference in connection configuration between one channel multiplexer and touch electrodes. 56 touch electrodes may configure the one touch block TBLK of FIG. 2 and are referred to by 1 to 56 in FIGS. 7 and 8.

The 56 touch electrodes may be divided into touch electrodes 1 to 14 and 29 to 42 of a first region R0 having 2 rows*14 columns (twenty-eight) and touch electrodes 15 to 28 and 43 to 56 of a second region R1 having 2 rows*14 columns (twenty-eight).

Referring to FIG. 7, each of the channel multiplexers CMUX1 to CMUX9 of the first group may be connected to 54 sensing channels SCH and 2 dummy channels DCH.

The touch electrodes 1 to 14 and 29 to 42 of the first region R0 may be connected to one of the channel multiplexers CMUX1 to CMUX9 of the first group through 28 sensing channels SCH. Some touch electrodes 15 to 27 and 43 to 55 of the second region R1 may be connected to one of the channel multiplexers CMUX1 to CMUX9 of the first group through 26 sensing channels SCH. The other touch electrodes 28 and 56 of the second region R1 may be floating-processed. The other touch electrodes 28 and 56 of the second region R1 may not be connected to the dummy channels DCH.

Referring to FIG. 8, each of the channel multiplexers CMUX10 to CMUX18 of the second group may be connected to 54 sensing channels SCH and 2 dummy channels DCH.

Some touch electrodes 1 to 13 and 29 to 41 of the first region R0 may be connected to one of the channel multiplexers CMUX10 to CMUX18 of the second group through 26 sensing channels SCH. The other touch electrodes 14 and 42 of the first region R0 may be floating-processed. The other touch electrodes 14 and 42 of the first region R0 may not be connected to the dummy channels DCH. The touch electrodes 15 to 28 and 43 to 56 of the second region R1 may be connected to one of the channel multiplexers CMUX10 to CMUX18 of the second group through 28 sensing channels SCH.

Figure 9:
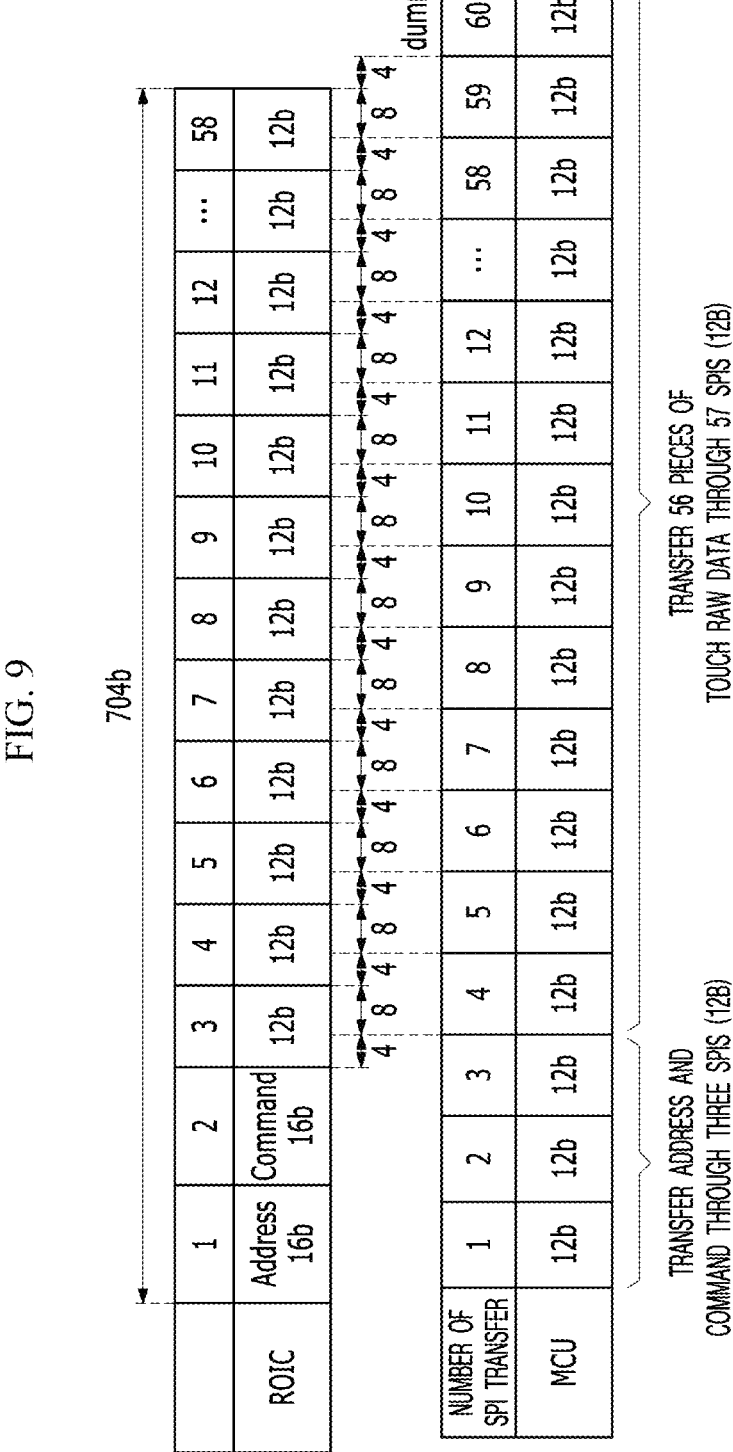
Figure 10:
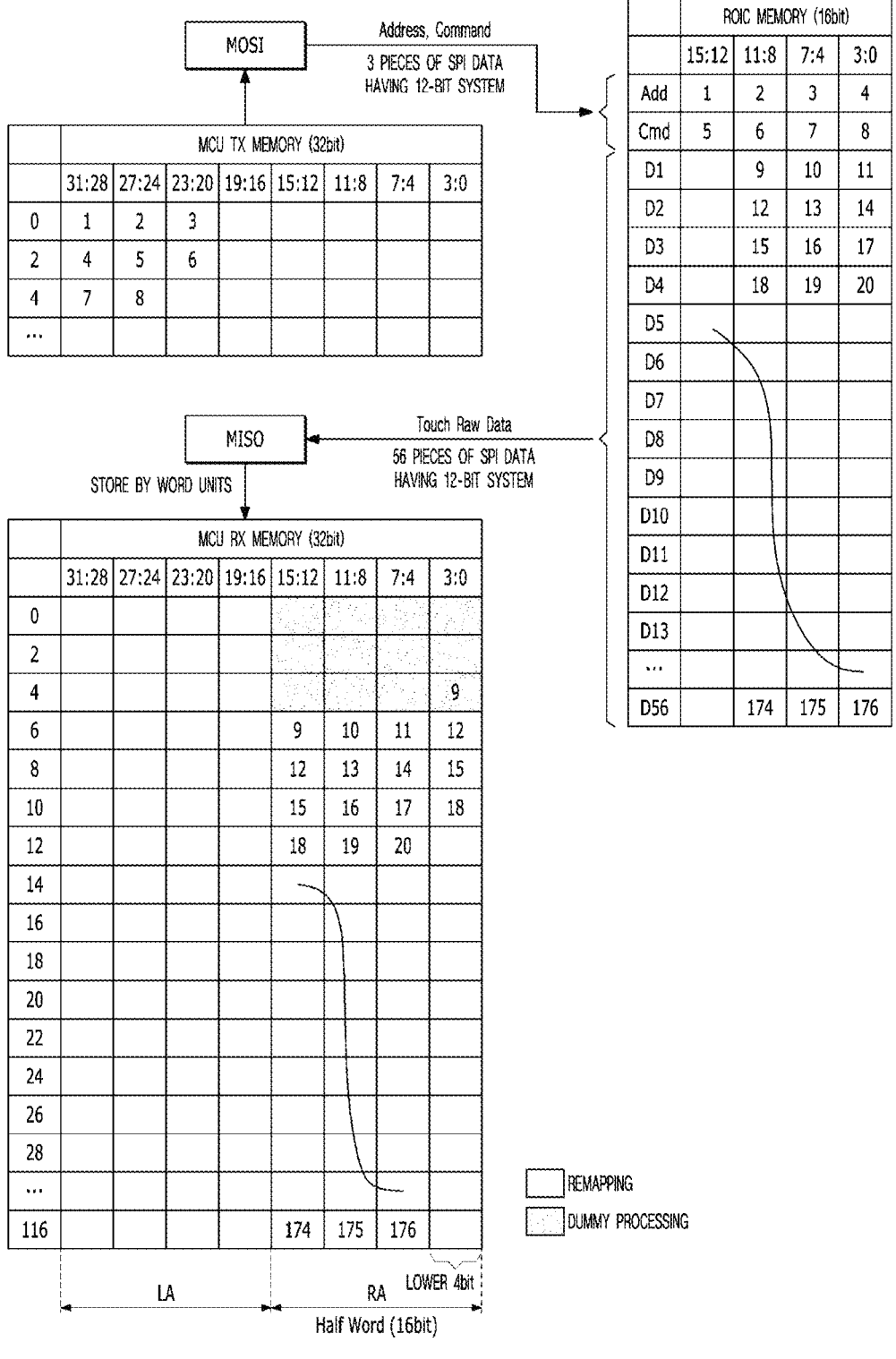

FIGS. 9 to 11 are diagrams illustrating an operation of a touch circuit according to a first example embodiment for decreasing a touch transfer time.

Referring to FIGS. 9 to 11, the touch circuit according to the first example embodiment may include an MCU TX memory, an MCU RX memory, and an ROIC memory.

The MCU TX memory may have a 32-bit storage system per row unit (0, 2, 4, etc.). To transfer address and command data as 3 pieces of SPI data having the 12-bit transfer system to an ROIC, the MCU TX memory may allocate 12 bits (1, 2, 3) of 16-bit address data (1, 2, 3, 4) to a $0^{th}$ row and may allocate 4 bits (4) to a $2^{nd}$ row. Also, the MCU TX memory may allocate 8 bits (5, 6) of 16-bit command data (5, 6, 7, 8) to the $2^{nd}$ row and may allocate 8 bits (7, 8) to a $4^{th}$ row. An MCU may process the address and command data of the MCU TX memory into 3 pieces of SPI data having the 12-bit transfer system to transfer to an ROIC through an MOSI transfer lane. In FIG. 10, "R" represents that the MCU reads the address and command data from the MCU TX memory.

The ROIC memory may have a 16-bit storage system per row unit. The ROIC memory may receive 3 pieces of SPI data having the 12-bit transfer system from the MCU, and then, may store 16-bit address data (1, 2, 3, 4) in a 16-bit address row and may store 16-bit command data (5, 6, 7, 8) in a 16-bit command row.

To transfer touch raw data as 57 pieces of SPI data having the 12-bit transfer system to the MCU, the ROIC memory may divisionally store 56 pieces of touch raw data in 12 bits of each of data rows D1 to D56. Only 12 bits of 16 bits of each of the data rows D1 to D56 may be used to store the touch raw data. Thus, referring to FIG. 9, each of the notations "704b," "16b," and "12B," may correspond to 704 bits, 16 bits, and 12 bits, respectively.

The MCU RX memory may have a 32-bit storage system per row unit. The MCU RX memory may be divided into a first storage region LA having a 16-bit row unit storage system and a second storage region RA having the 16-bit row unit storage system. The first storage region LA and the second storage region RA may horizontally and adjacently contact each other.

The MCU RX memory may store touch raw data by 32-bit word units by using all of the first and second storage regions LA and RA, and thus, may need 57 pieces of SPI data which includes one piece of dummy data in addition to 56 pieces of touch raw data. One piece of SPI data corresponding to dummy data may be irrelevant to touch information and may be for corresponding to a storage method of the MCU RX memory which stores touch raw data by 32-bit word units.

The MCU may receive 57 pieces of SPI data having the 12-bit transfer system through an MISO transfer lane and may store the 57 pieces of SPI data in the MCU RX memory by 32-bit word units. In FIG. 10, "W" represents that the MCU writes 56 pieces of touch raw data in the MCU RX memory.

To store 57 pieces of SPI data in the MCU RX memory by 32-bit word units, the MCU may perform a remapping operation and a dummy processing operation on the MCU RX memory. This will be described below in detail.

0 row 32 bits and 60 row 16 bits of the MCU RX memory may be dummy-processed. In the MCU RX memory except a dummy-processed region, upper 12 bits of the first storage region LA may be used as a storage region, and moreover, upper 12 bits of the second storage region RA may be used as a storage region. To this end, lower 4 bits of the first storage region LA and lower 4 bits of the second storage region RA may be discarded. Touch raw data corresponding to the lower 4 bits of the first storage region LA may be shifted to upper 4 bits of the second storage region RA and touch raw data corresponding to lower 4 bits of the second storage region RA may be shifted to upper 4 bits of the first storage region LA, and thus, 12-bit touch raw data may be remapped to upper 12 bits of each of the first storage region LA and the second storage region RA.

Figure 13:
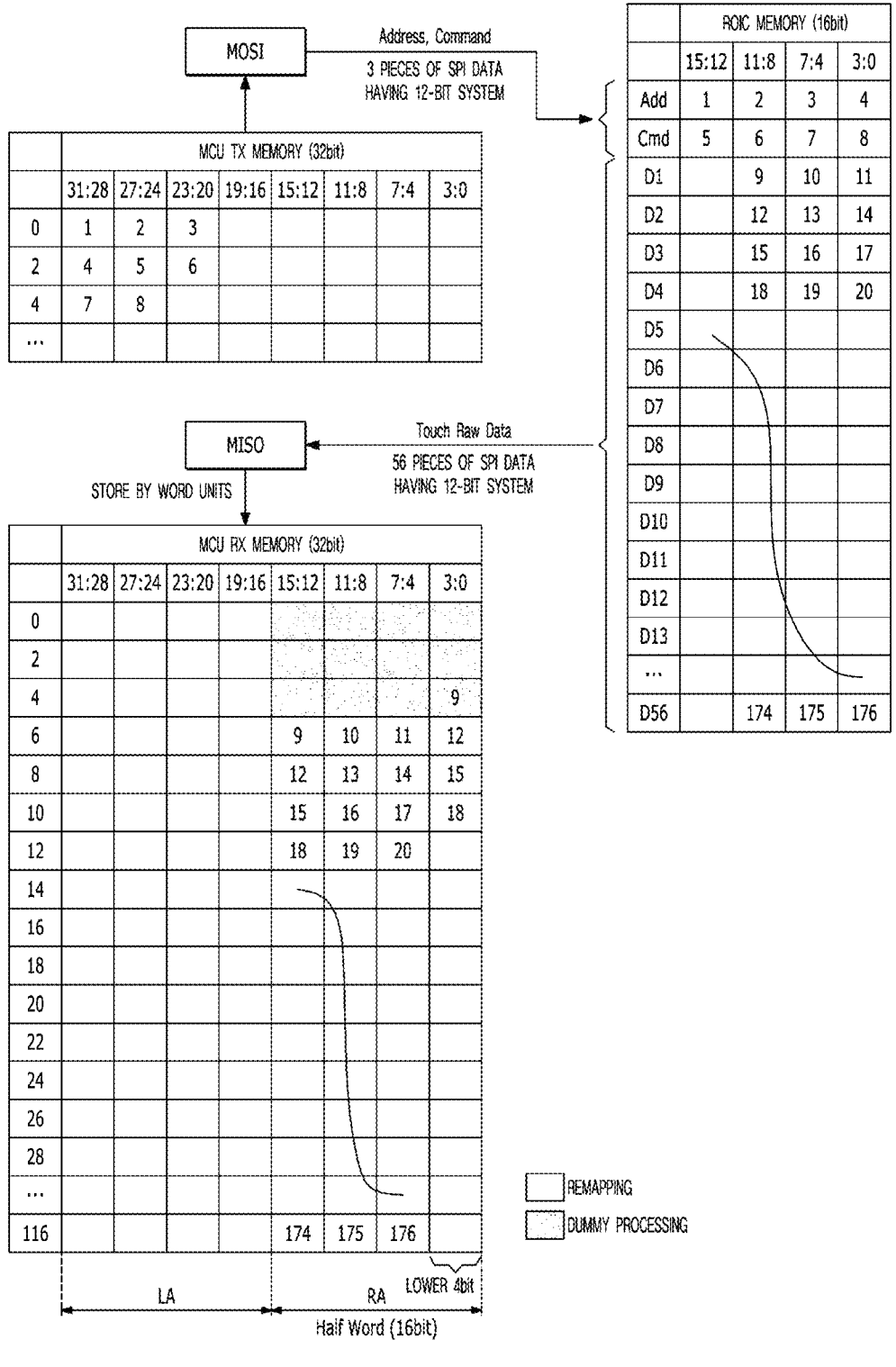
Figure 15:
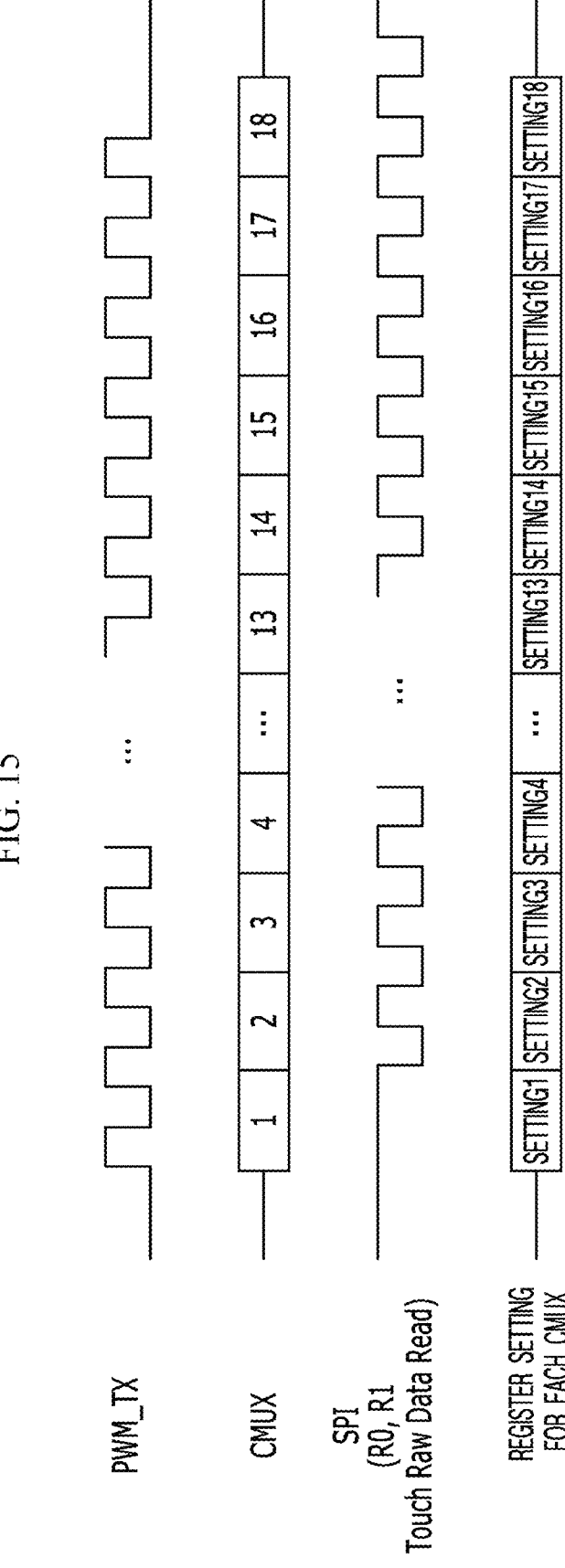

FIGS. 12 and 13 are diagrams illustrating an operation of a touch circuit according to a second example embodiment for decreasing a touch transfer time.

In a storage method an MCU RX memory, the second example embodiment may differ from the first example embodiment. The MCU RX memory according to the second example embodiment may store touch raw data by 16-bit half word units by using only one of the first and second storage regions LA and RA. In the second example embodiment, dummy data may not be needed. Accordingly, the number of SPI data according to the second example embodiment may decrease by one from 57 to 56.

To provide a detailed description, a touch circuit according to the second example embodiment may include an MCU TX memory, an MCU RX memory, and an ROIC memory.

Referring to FIGS. 12 and 13, the touch circuit according to the second example embodiment may include the MCU TX memory, the MCU RX memory, and the ROIC memory.

The MCU TX memory may have a 32-bit storage system per row unit (0, 2, 4, etc.). To transfer address and command data as 3 pieces of SPI data having the 12-bit transfer system to an ROIC, the MCU TX memory may allocate 12 bits (1, 2, 3) of 16-bit address data (1, 2, 3, 4) to a $0^{th}$ row and may allocate 4 bits (4) to a $2^{nd}$ row. Also, the MCU TX memory may allocate 8 bits (5, 6) of 16-bit command data (5, 6, 7, 8) to the $2^{nd}$ row and may allocate 8 bits (7, 8) to a $4^{th}$ row. An MCU may process the address and command data of the MCU TX memory into 3 pieces of SPI data having the 12-bit transfer system to transfer to an ROIC through an MOSI transfer lane.

The ROIC memory may have a 16-bit storage system per row unit. The ROIC memory may receive 3 pieces of SPI data having the 12-bit transfer system from the MCU, and then, may store 16-bit address data (1, 2, 3, 4) in a 16-bit address row and may store 16-bit command data (5, 6, 7, 8) in a 16-bit command row.

To transfer touch raw data as 56 pieces of SPI data having the 12-bit transfer system to the MCU, the ROIC memory may divisionally store 56 pieces of touch raw data in 12 bits of each of data rows D1 to D56. Only 12 bits of 16 bits of each of the data rows D1 to D56 may be used to store the touch raw data.

In the MCU RX memory, each row may be divided into a first storage region LA having the 16-bit storage system and a second storage region RA having the 16-bit storage system.

The MCU RX memory may store touch raw data by 16-bit half word units by using only one of the first and second storage regions LA and RA, and thus, may not need dummy data. For example, 56 pieces of SPI data except the dummy data may be stored in the second storage region RA of the MCU RX memory.

The MCU may receive 56 pieces of SPI data having the 12-bit transfer system through an MISO transfer lane and may store the 56 pieces of SPI data in the MCU RX memory by 16-bit half word units. To this end, the MCU may perform a remapping operation and a dummy processing operation on the MCU RX memory.

The first storage region LA of the MCU RX memory may be dummy-processed. In the second storage region RA of the MCU RX memory, 0 row 16 bits, 2 row 16 bits, and 4 row 16 bits may be dummy-processed. In the second storage region RA of the MCU RX memory except a dummy-processed region, upper 12 bits may be used as a storage region. To this end, lower 4 bits of the second storage region RA may be discarded. Touch raw data corresponding to the lower 4 bits of each row of the second storage region RA may be shifted to upper 4 bits of a next row, and thus, 12-bit touch raw data may be remapped to upper 12 bits of the second storage region RA.

FIGS. 14 to 18 are diagrams illustrating an operation of a touch circuit according to a third example embodiment for decreasing a touch transfer time.

As described above with reference to FIGS. 7 and 8, 56 touch electrodes included in one touch block (TBLK of FIG. 2) may be divided into touch electrodes 1 to 14 and 29 to 42 of a first region R0 having 2 rows*14 columns (twenty-eight) and touch electrodes 15 to 28 and 43 to 56 of a second region R1 having 2 rows*14 columns (twenty-eight). In this case, two touch electrodes (28 and 56 of FIGS. 7 and 14 and 42 of FIG. 8) of the 56 touch electrodes 1 to 56 may not be connected to sensing channels SCH and may be floating-processed. A channel corresponding to floating touch electrodes (28 and 56 of FIGS. 7 and 14 and 42 of FIG. 8) may be a dummy channel DCH.

In a case where one touch block (TBLK of FIG. 2) is connected to each of channel multiplexers CMUX1 to CMUX9 of a first group, positions of floating touch electrodes may be changed with respect to a case where one touch block is connected to each of channel multiplexers CMUX10 to CMUX18 of a second group.

The second example embodiment of FIGS. 12 and 13 described above may transfer 59 pieces of SPI data further including dummy touch raw data based on the floating touch electrodes (28 and 56 of FIGS. 7 and 14 and 42 of FIG. 8).

Referring to FIGS. 14 to 18, the touch circuit according to the third example embodiment may exclude the dummy touch raw data based on the floating touch electrodes (28 and 56 of FIGS. 7 and 14 and 42 of FIG. 8) and may transfer only real touch raw data as SPI data, thereby more decreasing a touch transfer time. The number of SPI data according to the third example embodiment may be 57 and may decrease by two compared to the second example embodiment.

To this end, the touch circuit according to the third example embodiment may register-set (or set in a register) the number of sensing channels connected to a first region R0 and a second region R1 of a touch block for each channel multiplexer. A register setting value may be set to setting 1 to setting 18 to correspond to each of channel multiplexers CMUX1 to CMUX18.

When the one touch block (TBLK of FIG. 2) is connected to each of the channel multiplexers CMUX1 to CMUX9 of the first group, floating touch electrodes may be touch electrodes 28 and 56 of the second region R1. Therefore, a register setting value corresponding to the channel multiplexers CMUX1 to CMUX9 of the first group may be set to the number of sensing channels "28" for the first region R0 and the number of sensing channels "26" for the second region R1.

When the one touch block (TBLK of FIG. 2) is connected to each of the channel multiplexers CMUX10 to CMUX18 of the second group, floating touch electrodes may be touch electrodes 14 and 42 of the first region R0. Therefore, a register setting value corresponding to the channel multiplexers CMUX10 to CMUX18 of the second group may be set to the number of sensing channels "26" for the first region R0 and the number of sensing channels "28" for the second region R1.

In one or more examples, a micro control circuit may include or may be a micro control unit (MCU) and vice versa. In one or more examples, the term TX may refer to transfer or transmit, and the term RX may refer to receive.

In one or more examples, an element may be one or more elements. In one or more examples, an element may include a plurality of elements. In one or more examples, a readout IC may include a plurality of readout ICs. In one or more examples, a register may include one or more registers.

The present example embodiments may realize the following effects.

According to one or more present example embodiments, an interface connecting an MCU to an ROIC may be designed as an SPI of a single read type, and thus, the manufacturing cost of the MCU may be reduced.

According to one or more present example embodiments, a transfer time of SPI data transferred and received between the MCU and the ROIC may be reduced to satisfy a short touch time needed for the SPI of the single read type. According to one or more present example embodiments, in order to decrease the transfer time of the SPI data, the number of bits of the SPI data may decrease, and moreover, the number of transfer of SPI data may be reduced.

The effects according to the present disclosure are not limited to the above examples, and other various effects may be included in the specification.

While the present disclosure has been particularly shown and described with reference to example embodiments thereof, it will be understood by those of ordinary skill in the art that various changes in form and details may be made therein without departing from the spirit and scope of the present disclosure as defined by the following claims and their equivalents.

What is claimed is:

1. A touch sensing display apparatus, comprising:
a display panel where a plurality of touch blocks are provided, and a plurality of touch electrodes are provided in each touch block;
a readout integrated circuit (IC) configured to sense the plurality of touch electrodes through touch lines to obtain touch raw data; and
a micro control circuit connected to the readout IC through a serial peripheral interface (SPI),
wherein a memory of the readout IC has a 16-bit row unit storage system,
each of a transfer (TX) memory and a receive (RX) memory of the micro control circuit has a 32-bit row unit storage system, and
in a touch period for touch driving, J (where J is a natural number) pieces of SPI data having a 12-bit transfer system corresponding to address and command data for reading the touch raw data are for being transferred from the micro control circuit to the readout IC, and K (where K is a natural number which is greater than J) pieces of SPI data having a 12-bit transfer system corresponding to the touch raw data are for being transferred from the readout IC to the micro control circuit.

2. The touch sensing display apparatus of claim 1, wherein the readout IC further comprises a plurality of channel multiplexers for time-divisionally sensing the plurality of touch blocks, and
the J pieces of SPI data having the 12-bit transfer system and the K pieces of SPI data having the 12-bit transfer system respectively correspond to the plurality of channel multiplexers.

3. The touch sensing display apparatus of claim 1, wherein the RX memory of the micro control circuit comprises a first storage region having a 16-bit row unit storage system and a second storage region having the 16-bit row unit storage system, and
the first storage region and the second storage region are disposed adjacent to each other and contact each other.

4. The touch sensing display apparatus of claim 3, wherein the RX memory of the micro control circuit is configured to store, by 32-bit word units, touch raw data included in the K pieces of SPI data having the 12-bit transfer system by using all of the first storage region and the second storage region.

5. The touch sensing display apparatus of claim 4, wherein one piece of dummy data, that is irrelevant to the touch raw data included in the K pieces of SPI data, is further included in the K pieces of SPI data, and
the dummy data is for a 32-bit word unit storage system.

6. The touch sensing display apparatus of claim 3, wherein the RX memory of the micro control circuit is configured to store, by 16-bit half word units, touch raw data included in the K pieces of SPI data having the 12-bit transfer system by using one of the first storage region and the second storage region.

7. The touch sensing display apparatus of claim 6, wherein dummy data, that is irrelevant to the touch raw data included in the K pieces of SPI data, is excluded from the K pieces of SPI data.

8. The touch sensing display apparatus of claim 2, wherein the plurality of touch electrodes included in the each touch block are divided into a first region and a second region, the plurality of channel multiplexers are divided into channel multiplexers of a first group and channel multiplexers of a second group, when the plurality of touch electrodes are connected to the channel multiplexers of the first group through sensing channels, some touch electrodes of one of the first region and the second region are floated without being connected to the sensing channels, and when the plurality of touch electrodes are connected to the channel multiplexers of the second group through the sensing channels, some touch electrodes of the other of the first region and the second region are floated without being connected to the sensing channels.

9. The touch sensing display apparatus of claim 8, wherein dummy touch raw data based on the some floated touch electrodes is excluded from the K pieces of SPI data.

10. The touch sensing display apparatus of claim 9, wherein the number of sensing channels to be connected to the first region and the second region of the each touch block is set in a register for each channel multiplexer.

* * * * *